United States Patent
Majumdar et al.

(10) Patent No.: US 10,754,759 B1
(45) Date of Patent: Aug. 25, 2020

(54) BREAKPOINTING CIRCUITRY THAT EVALUATES BREAKPOINT CONDITIONS WHILE RUNNING CLOCK TO TARGET CIRCUIT

(71) Applicant: Xilinx, Inc., San Jose, CA (US)

(72) Inventors: Amitava Majumdar, San Jose, CA (US); Georgios Tzimpragos, Goleta, CA (US); Jason Villarreal, Los Gatos, CA (US); Kumar Deepak, San Jose, CA (US); Jayashree Rangarajan, Los Altos Hills, CA (US)

(73) Assignee: Xilinx, Inc., San Jose, CA (US)

( * ) Notice: Subject to any disclaimer, the term of this patent is extended or adjusted under 35 U.S.C. 154(b) by 180 days.

(21) Appl. No.: 15/889,001

(22) Filed: Feb. 5, 2018

(51) Int. Cl.
*G06F 11/00* (2006.01)
*G06F 11/36* (2006.01)

(52) U.S. Cl.
CPC ...... *G06F 11/3652* (2013.01); *G06F 11/3664* (2013.01)

(58) Field of Classification Search
CPC ............... G06F 11/261; G06F 11/3656; G06F 11/3648; G06F 11/3636; G01R 31/3177
See application file for complete search history.

(56) References Cited

U.S. PATENT DOCUMENTS

| | | | | | |
|---|---|---|---|---|---|
| 5,038,282 A | * | 8/1991 | Gilbert | ................ | G06F 9/30065 712/14 |
| 5,121,498 A | * | 6/1992 | Gilbert | ................... | G06F 8/452 717/141 |
| 5,564,028 A | * | 10/1996 | Swoboda | ................ | G06F 9/321 710/264 |
| 6,065,106 A | * | 5/2000 | Deao | ................ | G01R 31/31705 712/227 |
| 6,154,856 A | * | 11/2000 | Madduri | ............... | G06F 11/348 712/227 |
| 6,385,742 B1 | * | 5/2002 | Kirsch | ............. | G01R 31/31705 712/227 |
| 7,043,668 B1 | * | 5/2006 | Treue | .................. | G06F 11/3636 712/227 |

(Continued)

OTHER PUBLICATIONS

Specification and drawings for U.S. Appl. No. 15/451,068, filed Mar. 6, 2017, Villarreal et al.

*Primary Examiner* — Bryce P Bonzo
*Assistant Examiner* — Jeison C Arcos
(74) *Attorney, Agent, or Firm* — Crawford Maunu PLLC

(57) ABSTRACT

An execution circuit inputs a plurality of data units, performs unit operations on the data units, and registers results of the unit operations in response to oscillations of a clock signal. A control circuit controls activation of the unit operations, and outputs a start signal to the execution circuit to activate each unit operation and/or a completion signal to indicate completion of each unit operation. A debug circuit stores breakpoint flags associated with the unit operations. Each breakpoint flag has a state that specifies whether to stop oscillations of the clock signal. The debug circuit further receives the start and/or completion signal and evaluates, while the clock signal oscillates to the execution circuit, a state of the start and/or completion signal and a state of the breakpoint flag associated with the unit operation. Oscillations of the clock signal are stopped in response to the evaluation of the signals.

18 Claims, 8 Drawing Sheets

(56) References Cited

U.S. PATENT DOCUMENTS

| | | | | |
|---|---|---|---|---|
| 7,055,070 B1* | 5/2006 | Uhler | G06F 11/3636 | 714/25 |
| 7,069,544 B1* | 6/2006 | Thekkath | G06F 11/364 | 714/E11.207 |
| 7,168,066 B1* | 1/2007 | Thekkath | G06F 11/3636 | 717/127 |
| 7,178,133 B1* | 2/2007 | Thekkath | G06F 11/3636 | 712/227 |
| 7,181,728 B1* | 2/2007 | Thekkath | G06F 11/3636 | 714/E11.207 |
| 8,812,907 B1* | 8/2014 | Bissett | G06F 11/1484 | 714/20 |
| 2002/0091494 A1* | 7/2002 | Kudo | G06F 11/261 | 702/119 |
| 2002/0116600 A1* | 8/2002 | Smith | G06F 9/3851 | 712/218 |
| 2004/0105298 A1* | 6/2004 | Symes | G06F 9/4812 | 365/149 |
| 2004/0172521 A1* | 9/2004 | Hooker | G06F 9/30043 | 712/225 |
| 2004/0250164 A1* | 12/2004 | Ahmad | G06F 11/364 | 714/30 |
| 2005/0038980 A1* | 2/2005 | Rodgers | G06F 9/30152 | 712/220 |
| 2006/0265577 A1* | 11/2006 | Sohm | G01R 31/31705 | 712/244 |
| 2007/0168985 A1* | 7/2007 | Konishi | G06F 11/3632 | 717/124 |
| 2008/0066055 A1* | 3/2008 | Shebs | G06F 11/36 | 717/124 |
| 2011/0040920 A1* | 2/2011 | Chou | G06F 13/28 | 710/316 |
| 2011/0082835 A1* | 4/2011 | Agrawal | G06F 11/1446 | 707/646 |
| 2011/0264898 A1* | 10/2011 | Chaudhry | G06F 9/3842 | 712/228 |
| 2012/0144240 A1* | 6/2012 | Rentschler | G06F 11/3636 | 714/34 |
| 2012/0216080 A1* | 8/2012 | Bansal | G06F 11/3476 | 714/45 |
| 2013/0046962 A1* | 2/2013 | Koesler | G06F 9/3802 | 712/227 |
| 2013/0297974 A1* | 11/2013 | Milks | G06F 11/26 | 714/30 |
| 2013/0318408 A1* | 11/2013 | Kilzer | G01R 31/3177 | 714/724 |
| 2014/0122929 A1* | 5/2014 | Nixon | G06F 11/27 | 714/30 |
| 2014/0351495 A1* | 11/2014 | Yoon | G06F 11/08 | 711/103 |

* cited by examiner

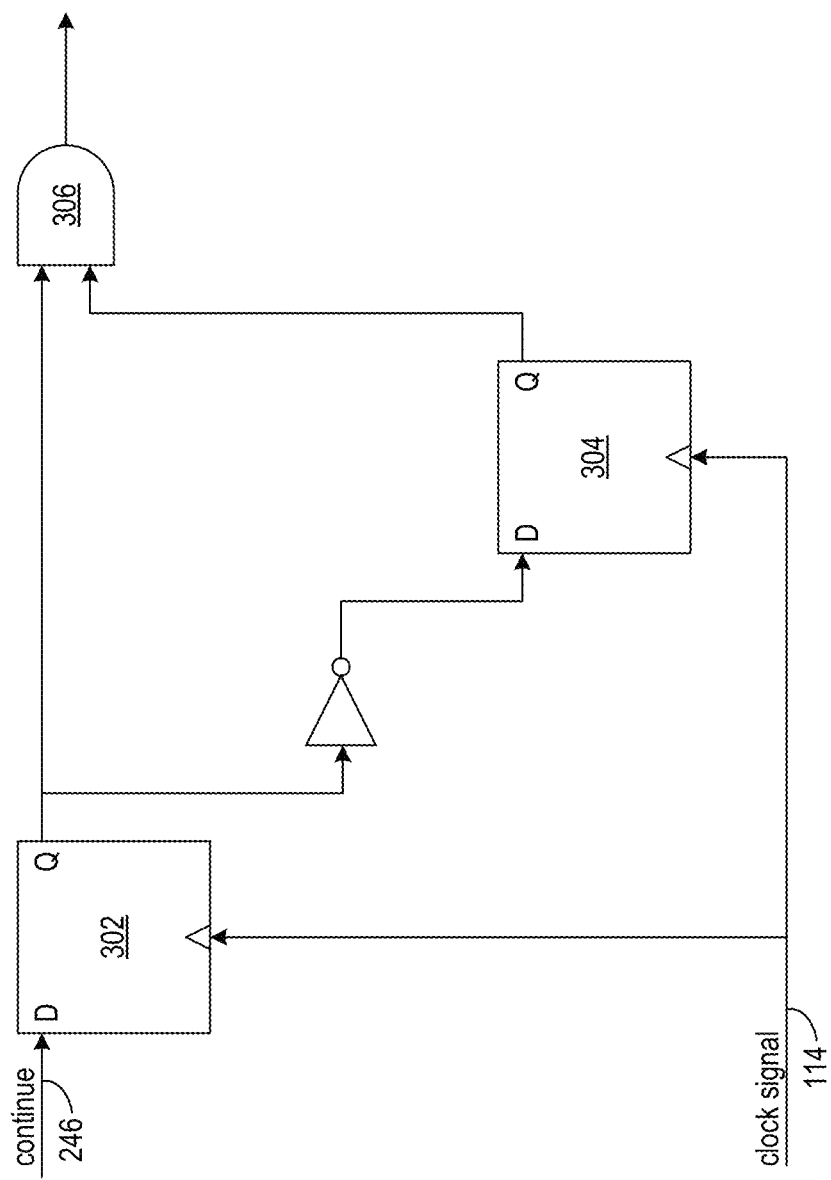

BREAKPOINTING CIRCUITRY THAT EVALUATES BREAKPOINT CONDITIONS WHILE RUNNING CLOCK TO TARGET CIRCUIT

TECHNICAL FIELD

The disclosure generally relates to circuitry that supports debugging of an application circuit.

BACKGROUND

One technique for improving performance of a software system is to implement selected sections as hardware accelerators. Those sections of the system that exhibit high computational complexity and consume large portions of total runtime may be suitable candidates for implementing as hardware accelerators. The hardware accelerators could be application-specific integrated circuits (ASICs), graphics processing units (GPUs), or circuitry running on field programmable gate arrays (FPGAs), for example. A common approach employed by software designers in creating a hardware accelerator is to use a high-level synthesis (HLS) tool to convert the original high-level language (HLL) specification of the identified section into an equivalent register transfer level (RTL) or other hardware description language (HDL) specification of the circuit. The hardware description of the circuit can then be processed using synthesis, map, place-and-route, and bitstream generation tools to create configuration data for manufacturing a circuit or configuring programmable logic.

A typical scenario in debugging a hardware accelerator entails setting breakpoints in the HLL code and creating hardware that implements the breakpoints in the hardware accelerator. The hardware accelerator can then be run and will automatically stop when a state is reached that satisfies a specified breakpoint. Once the hardware accelerator stops, the user can read out the contents of selected registers, analyze the data, and resume running the hardware accelerator. As used herein, "stopping the clock" refers to stopping oscillations of the clock signal that drives the hardware accelerator, and "starting" or "restarting" the clock refers to enabling oscillations of the clock signal that drives the hardware accelerator.

Debugging a hardware accelerator can be extremely time-consuming. One type of breakpoint allows a user to specify a Boolean expression. In order to determine whether or not a Boolean expression has been satisfied, the clock signal that drives the hardware accelerator is stopped after each cycle to permit evaluation of the expression. If the breakpoint is satisfied, the clock remains stopped, which allows the user to examine the state of the hardware accelerator. Otherwise, the clock is automatically restarted. The repeated stopping of the clock, evaluating the expression, and restarting the clock significantly slows execution of the hardware accelerator.

Another type of breakpoint is an operation-specific breakpoint (OSBP). An OSBP involves a breakpoint set on a particular operation performed by the hardware accelerator. An OSBP can be established by setting a breakpoint on a line of HLL program code, and generating debugging circuitry that accompanies the hardware accelerator. The debugging circuitry can stop execution of the hardware accelerator when the designated operation is performed. If the operation having the breakpoint is performed repeatedly, manually restarting the clock can become tedious for the user.

SUMMARY

A disclosed circuit arrangement includes an execution circuit, a control circuit, and a debug circuit. The execution circuit is configured to input a plurality of data units, perform unit operations on the data units, and register results of the unit operations in response to oscillations of a clock signal. The control circuit is coupled to the execution circuit and is configured to control activation of the unit operations, and output at least one of a respective start signal to the execution circuit to activate each unit operation or a respective completion signal indicating completion of the unit operation. The debug circuit is coupled to the control circuit and is configured to store a plurality of breakpoint flags associated with the unit operations, respectively. Each breakpoint flag has a state that specifies whether to stop oscillations of the clock signal. The debug circuit is further configured to receive the at least one of the respective start signal or respective completion signal associated with activation of each unit operation. The debug circuit evaluates, while the clock signal oscillates to the execution circuit, a state of the at least one of the respective start signal or the respective completion signal, and a state of the respective breakpoint flag associated with the unit operation. Oscillations of the clock signal are stopped by the debug circuit in response to the at least one of the respective start signal indicating activation of the unit operation or respective completion signal indicating completion of the unit operation, and the respective breakpoint flag associated with the unit operation having a state that specifies stopping oscillations of the clock signal.

A disclosed method includes inputting a plurality of data units to an execution circuit and generating respective start signals and/or respective completion signals by a control circuit for initiating unit operations to be performed by the execution circuit. The execution circuit performs unit operations on the plurality of data units in response to the respective start signals, and timing of the unit operations is in response to oscillations of a clock signal. A plurality of breakpoint flags associated with the unit operations are stored in storage circuitry. Each breakpoint flag has a state that specifies whether or not to stop oscillations of the clock signal. A debug circuit evaluates while the clock signal oscillates to the execution circuit, states of the respective start signals and/or respective completion signals and states of the respective breakpoint flags. The debug circuit stops oscillations of the clock signal in response to a start signal of the respective start signals indicating activation of the associated unit operation or a completion signal of the respective completion signals indicating completion of the associated unit operation, and the respective breakpoint flag associated with the unit operation having a state that specifies stopping oscillations of the clock signal.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 3 is a circuit diagram of an exemplary one-cycle pulse generator circuit;

DETAILED DESCRIPTION

Figure 1:
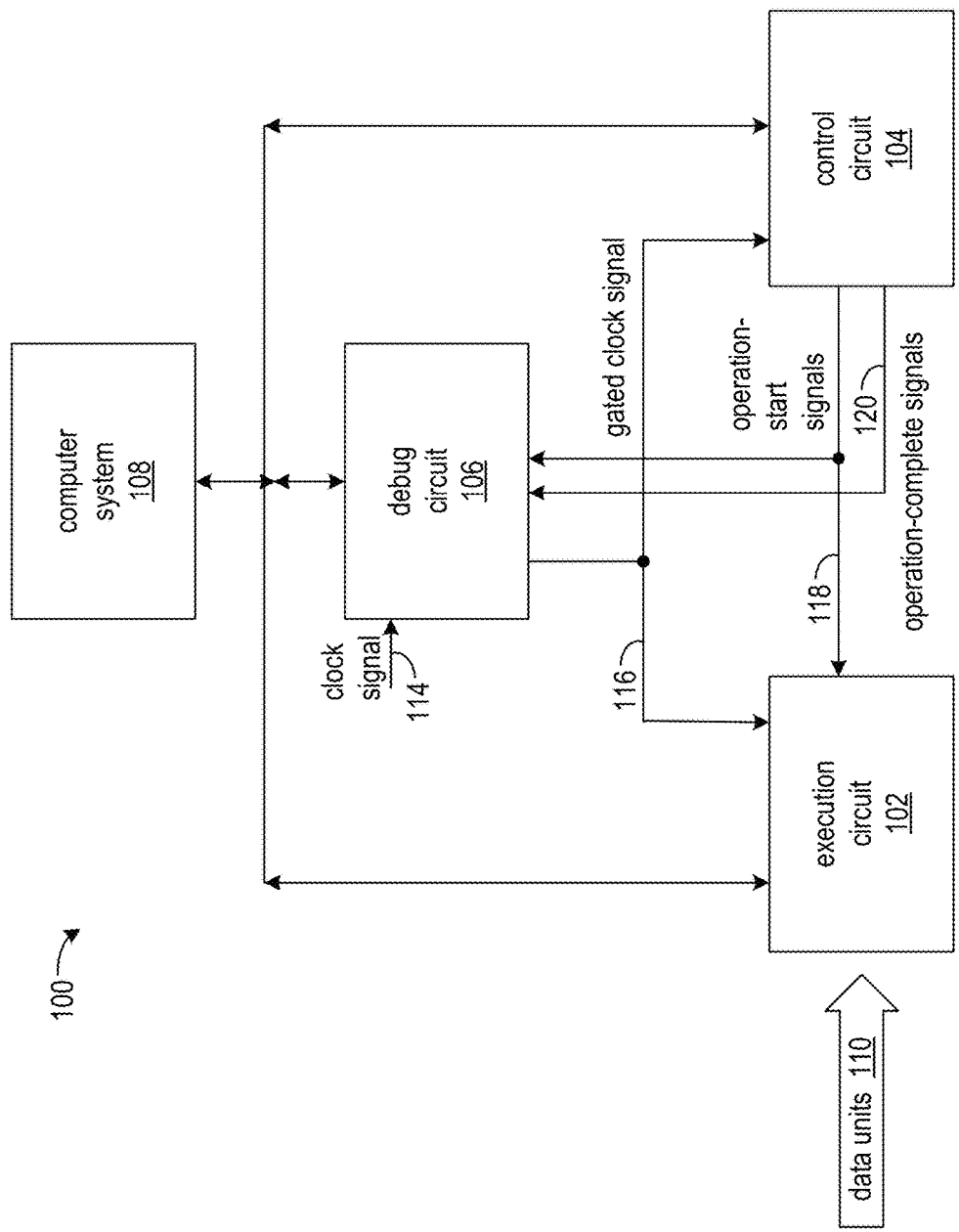
FIG. 1 shows an exemplary circuit arrangement having a debug circuit that evaluates operation-specific breakpoint (OSBP) conditions without having to stop the clock signal to an execution circuit.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods provide approaches for evaluating breakpoints set on operations of an HLL program that have been implemented as circuits on an integrated circuit (IC). A control circuit asserts respective operation-start signals to commence processing by execution circuitry that implements the operations. A debug circuit, which gates the clock signal to the execution circuitry, also receives the operation-start signals. The debug circuit evaluates, while the clock signal to the execution circuit continues to run, whether an operation-specific breakpoint (OSBP) has been set for an operation associated with each operation-start signal from the control circuit. If an OSBP has been set for the operation associated with an operation-start signal from the control circuit, the debug circuit stops the clock to the execution circuit in a timing safe manner that allows reading from registers of the execution circuit by a debugging program. The debug circuit further supports restarting the clock to the execution circuit in response to a user-initiated continue signal.

FIG. 1 shows an exemplary circuit arrangement 100 having a debug circuit 106 that evaluates OSBP conditions without having to stop the clock signal to the execution circuit 102. That is, the execution circuit continues to operate while the debug circuit evaluates OSBP conditions. The circuit arrangement includes an execution circuit 102, a control circuit 104, a debug circuit 106, and a computer system 108. Data units 110 are input to the execution circuit 102 for processing.

The computer system 108 is specifically programmed by a debugging program (not shown) through which operations of the execution circuit 102, control circuit 104, and debug circuit 106 can be controlled. The debugging program executing on the computer system translates user input key stroke and cursor sequences into corresponding configuration settings that can be stored in storage circuits (not shown) in the execution circuit 102, control circuit 104, and debug circuit 106.

The execution circuit 102 inputs data units and performs unit operations on the input data units. The data units can be input from an FPGA, host computer system, internal storage such as an on-die memory array or an external storage device. Results of each unit operation can be registered in a storage circuit in the execution circuit 102 in response to the oscillating input clock signal from the debug circuit 106. The debug circuit provides the oscillating clock signal 114 to the execution circuit 102 as gated clock signal 116. The execution circuit can be a central processing unit (CPU), graphics processing unit (GPU), or a circuit implemented in programmable logic, for example.

The control circuit 104 ensures correct timing of each unit operation in the execution circuit 102 and controls the time at which each unit operation implemented in the execution circuit is activated and deactivated. The control circuit transmits operation-start signals 118 to the execution circuit 102, and the state of each operation-start signal signals to the execution circuit 102 to activate the circuitry for performing a unit operation. Each unit operation can have an associated operation-start signal for triggering execution. One or more or all of the operation-start signals can also be input to the debug circuit 106. When the execution circuit 102 completes a unit operation, the control circuit indicates completion by the state of an operation-complete signal 120, which is transmitted to the debug circuit 106. Each unit operation can have a dedicated operation-complete signal 120. The operation-complete signals for all unit operations are shown as operation-complete signals 120.

The debug circuit 106 is coupled to the execution circuit 102, the control circuit 104, and the computer system 108. The debug circuit 106 inputs the operation -start signals 118 that are also input to the execution circuit 102. Through the debugging program executing on the computer system 108, one or more OSBPs can be enabled. Each unit operation on which a breakpoint can be set can have an associated break flag register (FIG. 2) in the debug circuit 106. The debugger program can provide a user interface for setting or clearing the break flag registers in order to enable or disable breakpoints on the associated unit operations.

The debug circuit 106 monitors the states of the operation-start signals 118. If the break flag register associated with a unit operation is set, and the state of the operation-start signal associated with the unit operation indicates that the unit operation is to be activated, the debug circuit 106 stops oscillations of the gated 116 clock signal. Notably, the debug circuit 106 allows the gated clock signal 116 to continue to oscillate while the debug circuit evaluates whether an OSBP has been activated. The debug circuit 106 does not stop the gated clock signal 116 to the execution circuit 120 to allow for evaluation of breakpoints as in prior approaches.

Alternatively, the circuit monitors can be configured such that instead of operation-start signal 118, the operation-complete signal 120 associated with a unit-operation is used in conjunction with the associated break flag register to indicate whether to stop clocks or not. If the break flag register associated with a unit operation is set, and the state of the operation-complete signal 120 associated with the unit operation indicates that the unit operation is completed, the debug circuit 106 stops oscillations of the gated 116 clock signal.

The program code in Example 1 shows a function that could be implemented as a hardware accelerator. When implemented as a circuit, the program code can be implemented as a pipeline of unit operations. The first unit operation in the pipeline implements "temp0=din0*din1." The unit operations that implement "temp1=temp0+5" and "temp2=temp0 * 2" follow the first unit operation and can be performed in parallel. The if-else statement can be implemented as two alternative branches of the pipeline, each having two unit operations that implement the program statements within the respective clause.

```
void example (int din0 , int din1, int*out)
{
temp0=din0*din1;
temp1=temp0+5;
temp2 =temp0*2;
if (temp1>temp2) {
   temp3=temp1*temp2;
   *out =temp3+5;
}
else {
   temp4=temp1+temp2;
   *out=temp4*5;
}
}
```

EXAMPLE 1

The data units input to the function are named, "din0" and "din1." An OSBP can be set on the unit operations. If a breakpoint is set on "temp2=temp0*2", for example, in response to the operation-start signal 118 from the control circuit 104 and associated with the unit operation indicating that unit operation is to commence, the debug circuit 106 stops oscillations of the gated clock signal 116 to the execution circuit 102.

When the debug 106 circuit detects an OSBP and stops oscillations of the gated clock signal 116, the debug circuit signals the debugging program on the computer system 108. The debugging program, in response to stoppage of the clock, enables reading data from and/or writing data to registers in the execution circuit 102. Once the user has examined the state of the hardware accelerator, the user can input a command to the debugging program to signal to the debug circuit to resume oscillations of the gated clock signal 116 to the execution circuit 102 and control circuit 104.

In some implementations, the execution circuit 102, control circuit 104, and debug circuit 106 are implemented in programmable logic. The programmable logic can be disposed on one or more integrated circuit die in an integrated circuit (IC) package, for example. The data units can be input from a computer system, a storage device external to the IC package, or storage circuits internal to the IC package.

Figure 2:
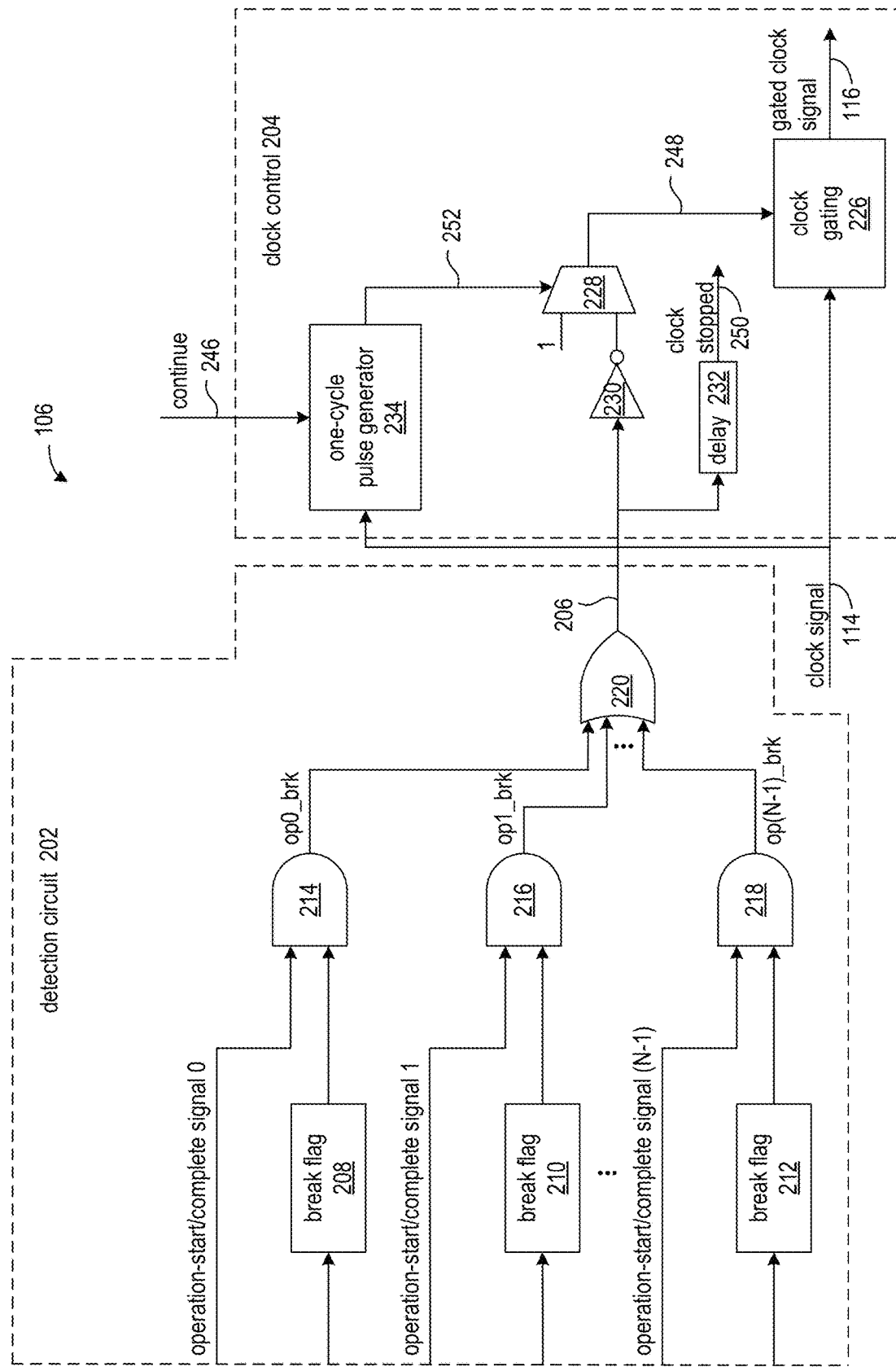
FIG. 2 shows an exemplary implementation of a debug circuit.

FIG. 2 shows an exemplary implementation of a debug circuit 106. The debug circuit includes a detection circuit 202 and a clock control circuit 204. The detection circuit 202 is configured to input operation-start and/or operation-complete signals 0 through N-1. Each of the operation-start/complete signals is associated with one of the unit operations performed by the execution circuit 102 of FIG. 1. The detection circuit generates a stop-clock signal having a state that indicates whether any unit operation has a breakpoint set and the associated operation-start/complete signal indicates that execution of the unit operation is to be initiated by the execution circuit 102. Each unit operation for which an OSBP can be set has an associated break flag register. The break flag registers associated with unit operations 0 through N-1 are shown as blocks 208, 210, . . . , 212. Each of AND circuits 214, 216, . . . , 218 can signal a break depending on the state of one of the operation-start/complete signals 0, 1, . . . , N-1 and the contents of an associated one of the break flag registers 208, 210, . . . , 212. If the operation-start/complete signal indicates that the associated unit operation is to be activated, and the state of the associated break flag register indicates the user set a breakpoint on that unit operation, the AND circuit asserts an operation-break signal. The operation-break signals from the AND circuits 214, 216, . . . , 218 are labeled op0_brk, op1_brk, op(N-1)_brk. The OR gate 220 outputs the stop clock signal 206 that indicates if any of operation break signals op0_brk, op1_brk, . . . , op(N-1)_brk signal a break. The values in the break flag registers 208, 210, . . . , 212 can be established by the debug program executing on the computer system 108 through a hardware interface provided by the hardware accelerator (not shown), for example. It will be appreciated that both the operation-start and completion signals for the same unit operation can be input to and evaluated by the detection circuit. In such an implementation, the same break flag register can be used for both start and completion, or alternatively, the operation-start can have an associated break flag register and the completion signal can have another associated break flag register. If both the operation-start and completion signals for the same unit operation are input to and evaluated by the detection circuit, separate AND circuits would be employed for the operation-start and completion signals.

Notably, the clock control circuit 204 continues to supply the oscillating gated clock signal 114 to the execution circuit 102 and control circuit 104 while the detection circuit 202 inputs operation-start/complete signals 0, 1, . . . , N-1 and checks for breaks. Whereas prior approaches stopped the clock to the executing circuitry at each cycle to evaluate breakpoint conditions, the disclosed circuits and methods allow the execution circuit 102 and control circuit 104 to continue to operate without stopping the clock until the detection circuit 202 determines that the break flag is set for a unit operation and the operation-start/complete signal for the unit operation indicates that the unit operation is to be activated.

The clock control circuit 204 controls the gated clock signal 116 in response to the stop clock signal 206 from the detection circuit 202 and the continue signal 246, which can be input from a debugging program (not shown). In an exemplary implementation, when the signal 248 at the clock enable input of the clock gating circuit 226 is logic 1, the clock signal 114 is passed as the gated clock signal 116. When the signal 248 at the clock enable input of the clock gating circuit is logic 0, the clock gating circuit stops oscillations of the gated clock signal 116.

The stop clock signal 206 is passed through inverter 230, and the inverted stop clock signal is input to the multiplexer 228. Thus, when a breakpoint is detected, the signal 248 at the enable input of the clock gating circuit 226 is logic 0, and the clock gating circuit stops oscillations of the gated clock signal 116. The stop clock signal 206 is also routed through delay circuit 232 and output to the debugging program as clocked stopped signal 250. The clock stopped signal indicates to the debugging program that the contents of the registers of the execution circuit 102 can be safely read. The delay is introduced to ensure that the contents of the registers are not read before the gated clock signal 116 has stopped at all leaf branches of the clock distribution network in the execution circuit 102.

The continue signal 246 can be asserted by the debugging program, for example, after the user has read the contents of one or more registers of the execution circuit 102 and the user directs the debugging program to continue with operations of the hardware accelerator. The continue signal 246 is input to a one-cycle pulse generator 234 that generates a 0-1-0 pulse in response to a 0-1 transition of the continue signal. The 0-1-0 pulse on signal line 252 lasts one full cycle of the clock signal 114. The pulse controls multiplexer 228, which drives a logic 1 on signal line 248 to the enable input of the clock gating circuit 226. After the one-cycle pulse, the multiplexer 228 selects the output of inverter 230, which enables the clock gating circuit 226 to resume oscillations of the gated clock signal by passing the clock signal 114 until the next DSBP is reached.

FIG. 3 is a circuit diagram of an exemplary one-cycle pulse generator circuit. In response to the continue signal 246 being logic 0, the output of AND gate 306 is 0. In response to the continue signal transitioning from logic 0 to logic 1 and captured in flip-flop 302 at the next edge of the clock signal 114, the output of the AND gate 306 becomes logic 0. The output of the AND gate remains logic 1 for one cycle of the clock signal, after which the output of flip-flop 304 goes to logic 0, which causes the output of the AND gate 306 to go to logic 0. Thus, the output of the AND gate 306 is pulse that lasts for one cycle of the clock signal 114. Though not shown, it will be recognized that the continue signal 246 and clock signal 114 are synchronized prior to driving the D input of flip-flop 302.

Figures 4, 5:
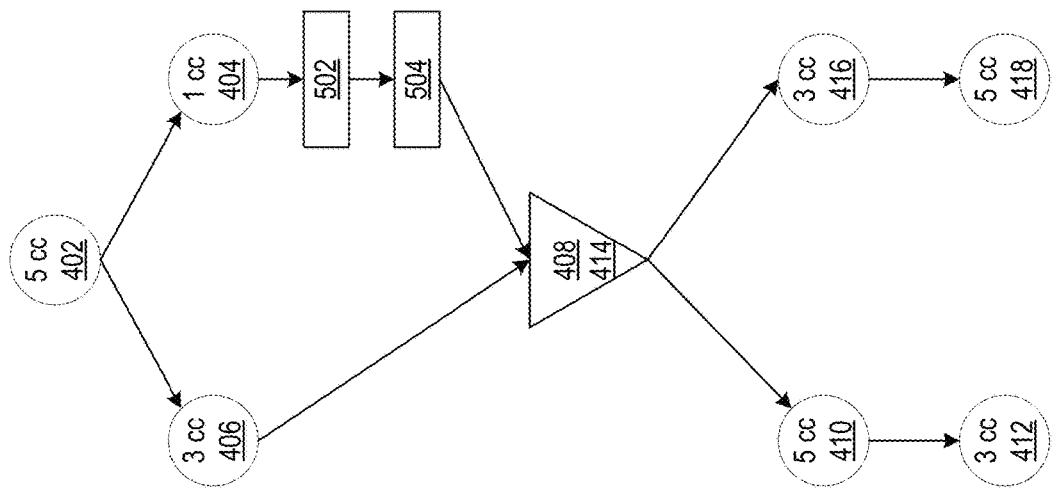
FIG. 4 shows the HLL function of Example 1.
FIG. 5 shows a flow graph that represents unit operations generated to implement to the HLL function of FIG. 4 in a pipelined circuit.

FIG. 4 shows the HLL function of Example 1, and FIG. 5 shows a flow graph that represents unit operations generated to implement to the HLL function in a pipelined circuit. The numbers of the HLL statements in FIG. 4 correspond to the numbers in the vertices in the graph of FIG. 5. Each of the vertices further indicates the number of clock cycles required to complete the associated unit operation. For example, vertex 402 in FIG. 5 corresponds to statement 402 in FIG. 4, and the unit operation to perform "temp0=din0*din1" requires 5 clock cycles. The unit operations that implement statements 404 and 406 can be performed in parallel as represented by the fork in the graph from vertex 402 to vertices 404 and 406.

The unit operation to perform statement 406 requires 2 clock cycles more than the unit operation to perform statement 404. To implement the flow graph as pipelined circuitry of unit operations, vertices 502 and 504 represent delay registers that store the output of the unit operation of vertex 404. Performing the unit operation of vertex 404 and shifting the output from the unit operation of vertex 404 through the two delay registers consumes a total of 3 clock cycles, as shifting the value through each register requires one clock cycle. The delay registers thereby delay the computed tempi value to coincide with availability of the temp2 value for evaluation by circuitry that implements if-statement 408. The triangular vertex labeled 408, 414 corresponds to the if-else statements 408 and 410. The fork from vertex 408, 414 signifies the alternative sets of unit operations that will be performed depending on whether temp1 is greater than temp2.

Figure 6:
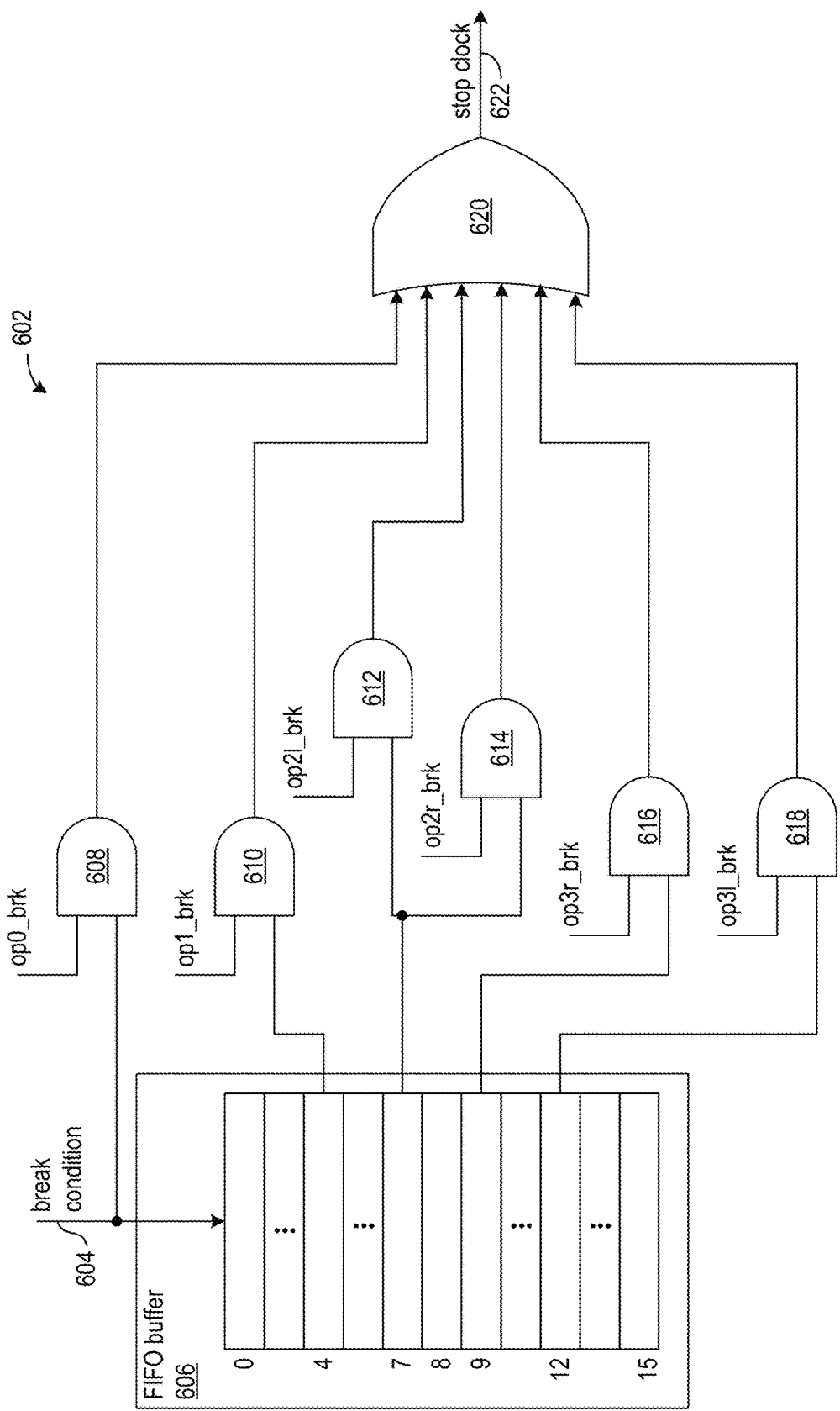
FIG. 6 shows an exemplary detection circuit that detects OSBPs in combination with an additional breakpoint condition in a pipelined circuit implementation of unit operations consistent with the example of FIG. 5.

FIG. 6 shows an exemplary detection circuit 602 that detects OSBPs in combination with an additional breakpoint condition in a pipelined circuit implementation of unit operations consistent with the example of FIG. 5. The additional breakpoint condition can be generated based on signal states, data unit values, or combination thereof. The additional breakpoint condition is input as break condition signal 604, and the state of the signal is stored in FIFO buffer 606. At each clock cycle, the state of the break condition signal 604 can be input to the entry 0 in the FIFO buffer 606 and previously stored break condition signal states shifted through the buffer.

The opX_brk signals in FIG. 6 are similar in function to the operation-break signals op0_brk, op1_brk, op(N-1)_brk of FIG. 3. However, the operation-break signals of FIG. 6 correspond to the unit operations of FIG. 5. The circuitry for generating the operation-break signals in the detection circuit 202 of FIG. 3 can be replicated in the detection circuit 602, but is not shown to avoid unnecessarily complicating the drawing. Operation-break signal op0_brk is generated based on the operation-start/complete signal for unit operation 402 and the associated break flag register (not shown); and operation-break signal op1_brk is generated based on the operation-start/complete signal for unit operations 404 and 406 and the associated break flag registers (not shown). Note that only one operation-start/complete signal is needed for operations 404 and 406 as both operations are activated at the same time, and the op1_brk signal can be based on the operation-start/complete signal for unit operations 404 and 406 and the states of the associated break flag registers of unit operations 404 and 406 (e.g., (operation-start/complete signal AND break flag 404) OR (operation-start/complete signal AND break flag 406)). Operation-break signal op2l_brk is generated based on the operation-start/complete signal for unit operation 410 and the associated break flag register (not shown); operation-break signal op2r_brk is generated based on the operation-start/complete signal for unit operation 416 and the associated break flag register (not shown); operation-break signal op3l_brk is generated based on the operation-start/complete signal for unit operation 412 and the associated break flag register (not shown); and operation-break signal op2r_brk is generated based on the operation-start/complete signal for unit operation 418 and the associated break flag register (not shown).

The inputs to each of the AND circuits 608, 610, 612, 614, 616, and 618 include one of the operation-break signals op0_brk, op1_brk, op2l_brk, op2r_brk, op3l_brk, or op3r_brk and the state of the break condition signal 604 as input to the FIFO buffer 606 or stored in one of the entries of the FIFO buffer. AND circuit 608 inputs op0_brk, which is based on activation of the unit operation corresponding to vertex 402 ("unit operation 402" for brevity), and the current state of the break condition signal 604. The current state of the break condition signal is input to the AND circuit 608, because the unit operation 402 is the first unit operation in the exemplary pipeline circuitry.

AND circuit 610 inputs the op1_brk signal, which is based on activation of the unit operations 404 and 406, and the state of the break condition signal at entry 4 in the FIFO buffer 606. The state of the break condition signal at entry 4 in the FIFO buffer is paired with the op1_brk signal corresponding to activation of the unit operations 404 and 406, because the unit operation 402 requires 5 cycles (FIG. 5), and the state of the break condition signal 604 when unit operation 402 was activated will be present in entry 4 of the FIFO buffer when unit operations 404 and 406 are activated.

AND circuit 612 inputs the op2l_brk signal, which is based on activation of the unit operation 410, and the state of the break condition signal at entry 7 in the FIFO buffer 606. The state of the break condition signal at entry 7 in the FIFO buffer is paired with the op2l_brk signal corresponding to activation of the unit operation 410, because unit operations 402, 404 and 406 require a total of 8 clock cycles (FIG. 5), and the state of the break condition signal 604 when unit operation 402 was activated will be present in entry 7 of the FIFO buffer when unit operation 410 is activated. Similarly, AND circuit 614 inputs the op2r_brk signal, which is based on activation of the unit operation 416, and the state of the break condition signal at entry 7 in the FIFO buffer 606.

AND circuit 616 inputs the op3r_brk signal, which is based on activation of the unit operation 418, and the state of the break condition signal at entry 9 in the FIFO buffer 606. AND circuit 618 inputs the op3l_brk signal, which is based on activation of the unit operation 412, and the state of the break condition signal at entry 12 in the FIFO buffer 606.

OR circuit 620 inputs the signals generated by AND circuits 608, 610, 612, 614, 616, and 618 and generates a stop clock signal 622, which can be provided as input to the clock control circuit 204 as in FIG. 2.

Figure 7:
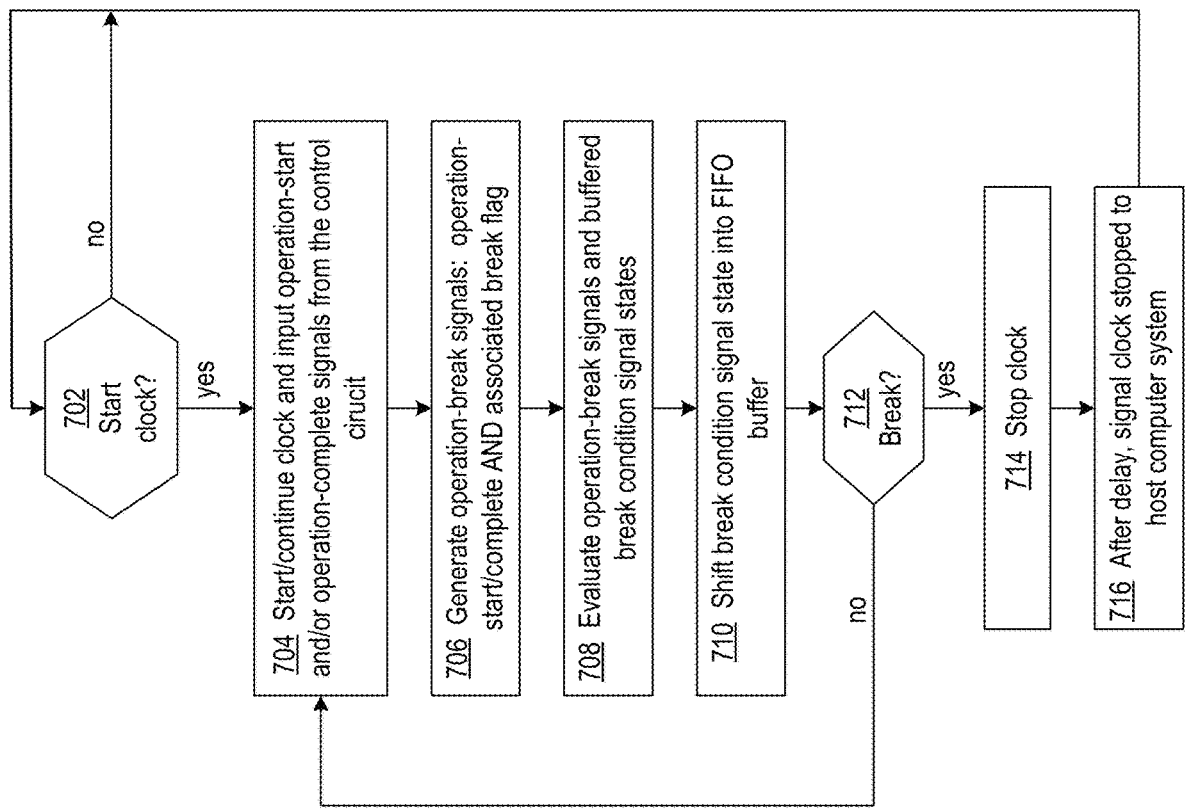
FIG. 7 is a flowchart of an exemplary process of handling operation-specific breakpoint(s) by a debug circuit.

FIG. 7 is a flowchart of an exemplary process of handling operation-specific breakpoint(s) by a debug circuit 106. The debug circuit controls oscillations of the clock signal 116 provided to the execution circuit 102 and control circuit 104 of the hardware accelerator. At decision block 702, the debug circuit determines whether the clock signal should be started. The decision can be made based on a control signal from a debugging program as initiated by a user, for example.

If the debug circuit determines that the clock is to be started, at block 704, the clock is started and the debug circuit inputs the operation-start signals provided by the control circuit 104 (FIG. 1) and/or operation-complete signals from the execution circuit 102.

At block 706, the debug circuit generates operation-break signals in response to the input operation-start/complete signals and the associated break flags. As exemplified in FIG. 2, each operation-break signal can be generated by an AND circuit that inputs the operation-start/complete signal for a unit operation and a state of a break flag register associated with that unit operation.

At block 708, the debug circuit 106 evaluates the operation-break signals, along with states of a buffered break condition signal if implemented. In an implementation not using a break condition, the evaluation can be provided by an OR circuit, as exemplified by OR circuit 220 in FIG. 2. In an implementation involving a break condition, the evaluation can be provided by a collection of AND circuits feeding an OR circuit, as exemplified by AND circuits 608, 610, 612, 614, 616, and 618 and OR circuit 620 in FIG. 6. The debug circuit shifts the current state of the break condition signal into a FIFO buffer at block 710. Notably, the clock signal to the execution circuit is not interrupted while the debug circuit performs the operations of blocks 706, 708, and 710.

Decision block 712 tests whether the results of performing the operations of blocks 706 and 708 indicate that operations of the execution circuit should be stopped. If so, the debug circuit stops the clock to the execution circuit and control circuit at block 714. After stopping the clock, at block 716 the debug circuit delays to allow the clock signal to stop at all leaf branches of the clock distribution network in the execution circuit, and then signals to the host computer system executing a debugging program that the clock to the hardware accelerator has been stopped. The process then continues at block 702 to await a continue signal from the host debugger system.

If the results of performing the operations of blocks 706 and 708 do not indicate that operations of the execution circuit should be stopped, the debug circuit returns to block 704 where the clock to the execution circuit and control circuit continues to run.

Figure 8:
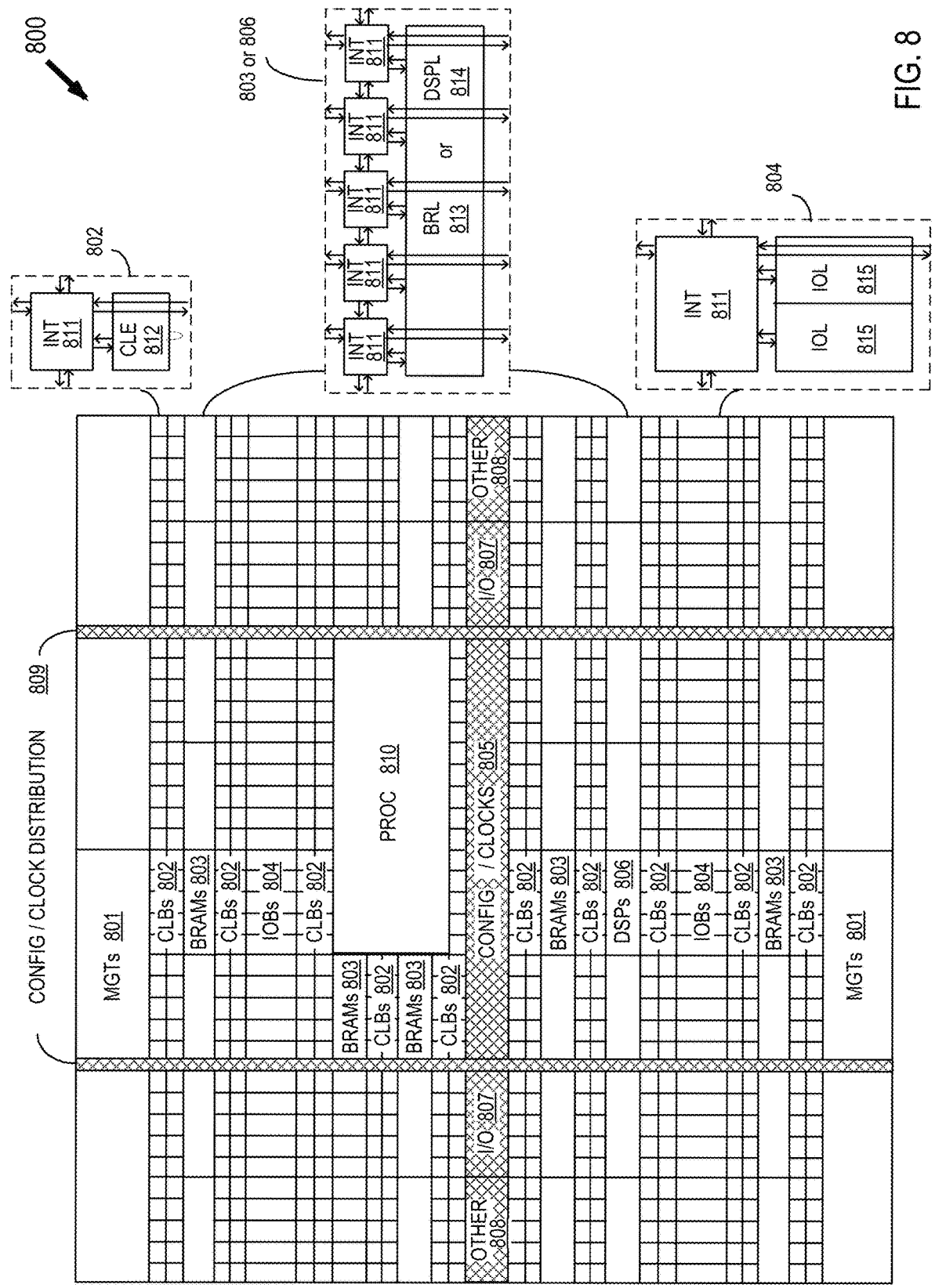
FIG. 8 shows a programmable integrated circuit (IC) on which the disclosed circuits and processes can be implemented.

FIG. 8 shows a programmable integrated circuit (IC) 800 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element (DSPL) 814 in addition to an appropriate number of programmable interconnect elements. An IOB 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

Figure 9:
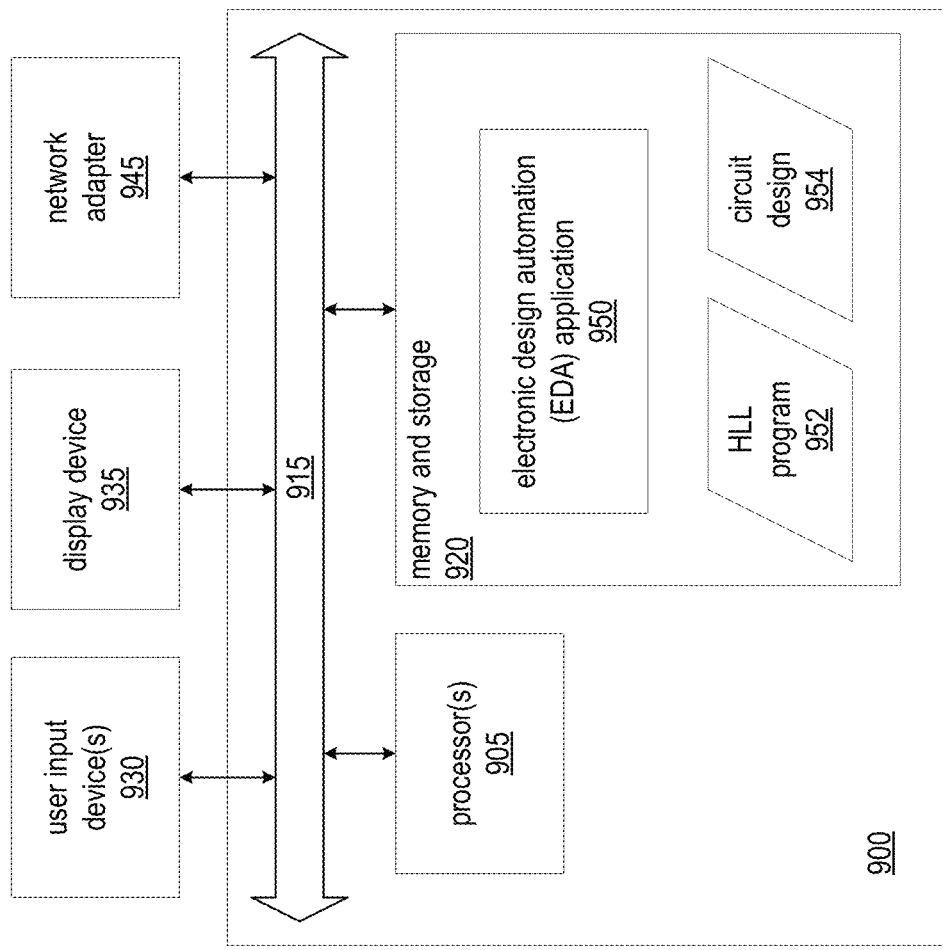
FIG. 9 is a block diagram illustrating an exemplary computer system.

FIG. 9 is a block diagram illustrating an exemplary computer system (system) 900. System 900 is an example of an EDA system. As pictured, system 900 includes at least one processor circuit (or "processor"), e.g., a central processing unit (CPU) 905 coupled to memory and storage arrangement 920 through a system bus 915 or other suitable circuitry. System 900 stores program code and HLL program 952 within memory and storage arrangement 920. Processor 905 executes the program code accessed from the memory and storage arrangement 920 via system bus 915. In one aspect, system 900 is implemented as a computer or other data processing system that is suitable for storing and/or executing program code. It should be appreciated, however, that system 900 can be implemented in the form of any system including a processor and memory that is capable of performing the functions described within this disclosure.

Memory and storage arrangement 920 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 900 may also include one or more cache memories (not shown) that provide temporary storage of at least some program code and data in order to reduce the number of times program code and data must be retrieved from local memory and persistent storage during execution.

Input/output (I/O) devices such as user input device(s) 930 and a display device 935 may be optionally coupled to system 900. The I/O devices may be coupled to system 900 either directly or through intervening I/O controllers. A network adapter 945 also can be coupled to system 900 in order to couple system 900 to other systems, computer systems, remote printers, and/or remote storage devices through intervening private or public networks. Modems, cable modems, Ethernet cards, and wireless transceivers are examples of different types of network adapter 945 that can be used with system 900.

Memory and storage arrangement 920 may store an EDA application 950. EDA application 950, being implemented in the form of executable program code, is executed by processor(s) 905. As such, EDA application 950 is considered part of system 900. System 900, while executing EDA application 950, receives and operates on HLL program 952. In one aspect, system 900 performs a design flow on HLL program 952, and the design flow can include synthesis, mapping, placement, routing, and host the debugging program as described herein. System 900 generates a hardware accelerator version of HLL program 952 as circuit design 954.

EDA application 950, HLL program 952, circuit design 954, and any data items used, generated, and/or operated upon by EDA application 950 are functional data structures that impart functionality when employed as part of system 900 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for debugging circuits generated from HLL programs. Other aspects and features will be apparent to those skilled in the art from consideration of the specification. It is intended that the specification and drawings be considered as examples only, with a true scope of the invention being indicated by the following claims.

What is claimed is:

1. A circuit arrangement comprising:
an execution circuit configured to:
  input a plurality of data units,
  perform unit operations on the data units, and
  register results of the unit operations in response to oscillations of a clock signal;
a control circuit coupled to the execution circuit and configured to:
  output the clock signal to the execution circuit,
  control activation of the unit operations,
  output at least one of a respective start signal to the execution circuit to activate each unit operation, or a respective completion signal to indicate completion of each unit operation; and
a debug circuit coupled to the control circuit, the debug circuit including a detection circuit and a clock control circuit coupled to receive a start-clock signal, and configured to:
  store a plurality of breakpoint flags associated with the unit operations, respectively, each breakpoint flag having a state that specifies whether to stop oscillations of the clock signal,
  receive the at least one of the respective start signal or the respective completion signal,
  evaluate, while the clock signal oscillates to the execution circuit, at least one of the respective start signal or the respective completion signal, and the respective breakpoint flag associated with the unit operation,
  wherein the detection circuit is configured to generate a stop-clock signal indicating that the at least one of the respective start signal indicates activation of the unit operation or the respective completion signal indicates completion of the unit operation, and the respective breakpoint flag associated with the unit operation specifies stopping oscillations of the clock signal; and
  wherein the clock control circuit is configured to stop oscillations of the clock signal in response to the stop-clock signal and start the oscillations of the clock signal in response to the start-clock signal.

2. The circuit arrangement of claim 1, wherein:
the debug circuit is further configured to store states of a break condition signal occurring at different times in a first-in-first-out (FIFO) buffer;
the detection circuit is configured to generate a respective operation-break signal for each unit operation, the respective operation-break signal having a state dependent on states of the at least one of the respective start signal or the respective completion signal, and respective breakpoint flag; and
the clock control circuit is configured to stop oscillations of the clock signal in response to a state of the break condition signal in an entry of the FIFO buffer and the state of the respective operation-break signal.

3. The circuit arrangement of claim 2, wherein the debug circuit is further configured to shift the states of the break condition signal in the FIFO buffer.

4. The circuit arrangement of claim 1, wherein:
the detection circuit includes a first-in-first-out (FIFO) buffer configured for storage of states of a break condition signal, and the detection circuit is further configured to generate a respective operation-break signal for each unit operation, the respective operation-break signal having a state dependent on states of the at least one of the-respective start signal or respective completion signal, and breakpoint flag; and
the clock control circuit is configured to stop oscillations of the clock signal in response to a state of the break condition signal in an entry of the FIFO buffer and the state of the respective operation-break signal.

5. The circuit arrangement of claim 4, wherein the detection circuit is further configured to shift the states of the break condition signal in the FIFO buffer every N clock cycles, wherein N≥1.

6. The circuit arrangement of claim 1, wherein:
the debug circuit includes a first-in-first-out (FIFO) buffer configured for storage of states of a break condition signal at different times in a plurality of entries of the FIFO buffer, and the debug circuit is further configured to shift the states of the break condition signal in the FIFO buffer;
the detection circuit includes a respective AND circuit corresponding to an operation-break signal of a plurality of operation-break signals and having a first input coupled to receive the corresponding operation-break signal and a second input coupled to receive the state of the break condition signal in one of the plurality of entries of the FIFO buffer; and
the detection circuit includes an OR circuit having inputs coupled to receive output from each respective AND circuit, wherein an output signal of the OR circuit is the stop-clock signal.

7. The circuit arrangement of claim 1, further comprising:
a computer system coupled to the debug circuit, wherein the computer system is configured to input commands from a user for stopping and starting the execution circuit and reading data from registers in the execution circuit;
wherein the debug circuit is further configured to signal the computer system that the oscillations of the clock signal have been stopped in response to stopping the oscillations of the clock signal; and
wherein the computer system is further configured to enable reading data from the registers in the execution circuit in response to the signal from the debug circuit indicating that the oscillations of the clock signal have been stopped.

8. The circuit arrangement of claim 7, wherein:
the debug circuit is further configured to store states of a break condition signal occurring at different times in a first-in-first-out (FIFO) buffer;
the detection circuit is configured to generate a respective operation-break signal for each unit operation, the respective operation-break signal having a state dependent on states of the at least one of the respective start signal or the respective completion signal, and respective breakpoint flag; and
the detection circuit is configured to generate the stop-clock signal in response to a state of the break condition signal in an entry of the FIFO buffer and the state of the respective operation-break signal.

9. The circuit arrangement of claim 1, wherein the execution circuit, control circuit, and debug circuit are implemented in programmable logic.

10. A method comprising:
inputting a plurality of data units to an execution circuit;
generating by a control circuit for each unit operation to be performed by the execution circuit, at least one of a respective start signal for initiating the unit operation to be performed by the execution circuit, or a respective completion signal indicating completion of the unit operation;
performing unit operations on the plurality of data units by the execution circuit in response to the respective start signals;
outputting a clock signal from a debug circuit to the execution circuit;
timing the unit operations in response to oscillations of the clock signal;
storing in storage circuitry, a plurality of breakpoint flags associated with the unit operations, respectively, each breakpoint flag having a state that specifies whether or not to stop oscillations of the clock signal;
evaluating by a debug circuit while the clock signal oscillates to the execution circuit, states of the respective start signal or the respective completion signal, and states of the respective breakpoint flags;
generating by the debug circuit, a stop-clock signal having a state indicating that the at least one of the respective start signal indicates activation of the associated unit operation or the respective completion signal indicates completion of the associated unit operation, and the respective breakpoint flag associated with the unit operation has a state that specifies stopping oscillations of the clock signal; and
stopping oscillations of the clock signal by the debug circuit, in response to the stop-clock signal.

11. The method of claim 10, further comprising:
storing states of a break condition signal occurring at different times in a first-in-first-out (FIFO) buffer;
generating by the debug circuit, a respective operation-break signal for each of unit operations, the respective operation-break signal having a state dependent on states of the at least one of the respective start signal or respective completion signal, and respective breakpoint flag associated with the unit operation; and
wherein the stopping oscillation of the clock signal includes stopping oscillations of the clock signal in response to a state of the break condition signal in an entry of the FIFO buffer and the state of the respective operation-break signal.

12. The method of claim 11, further comprising shifting the states of the break condition signal in the FIFO buffer.

13. The method of claim 10, further comprising starting the oscillations of the clock signal by the debug circuit in response to a start-clock signal.

14. The method of claim 13, further comprising:
storing states of a break condition signal occurring at different times in a first-in-first-out (FIFO) buffer;
generating by the debug circuit, a respective operation-break signal for each unit operations, the respective operation-break signal having a state dependent on states of the at least one of the respective start signal or the respective completion signal, and respective breakpoint flag associated with the unit operation; and
wherein the stopping oscillations of the clock signal includes stopping oscillations of the clock signal in response to a state of the break condition signal in an entry of the FIFO buffer and the state of the respective operation-break signal.

15. The method of claim 14, further comprising shifting the states of the break condition signal in the FIFO buffer every N clock cycles, wherein N≥1.

16. The method of claim 10, wherein the debug circuit includes:
storing states of a break condition signal occurring at different times in a first-in-first-out (FIFO) buffer;
shifting the states of the break condition signal in the FIFO buffer;
inputting each operation-break signal to a first input of a respective AND circuit and inputting the state of break condition signal in one of a plurality of entries of the FIFO buffer to a second input of the respective AND circuit;
inputting output signals from each respective AND circuit to an input of an OR circuit; and
wherein the stopping oscillations of the clock signal is in response to an output signal of the OR circuit.

17. The method of claim 10, further comprising:
signaling a computer system by the debug circuit that the oscillations of the clock signal have been stopped in response to the debug circuit stopping the oscillations of the clock signal; and
enabling reading data from registers in the execution circuit by the computer system in response to the debug circuit signaling that the oscillations of the clock signal have been stopped.

18. The method of claim 17, further comprising:
storing states of a break condition signal occurring at different times in a first-in-first-out (FIFO) buffer;
generating by the debug circuit, a respective operation-break signal for each unit operation, the respective operation-break signal having a state dependent on states of the at least one of the respective start signal or respective completion signal, and respective breakpoint flag associated with the unit operation; and
wherein the stopping oscillation of the clock signal includes stopping oscillations of the clock signal in response to a state of the break condition signal in an entry of the FIFO buffer and the state of the respective operation-break signal.

\* \* \* \* \*